Patented Dec. 26, 1950

2,535,209

UNITED STATES PATENT OFFICE 2,535,209

SELECTIVE TREE BANDING COMPOSITION

Bert Hubert, Batavia, Dutch East Indies, assignor, by mesne assignments, to N. V. D. de Wit Hzn, Rijswijk, Netherlands, a corporate body of the Netherlands No Drawing. Application November 26, 1946, Serial No. 712,254. In the Netherlands April 19, 1944

Section 1, Public Law 690, August 8, 1946
Patent expires April 19, 1964

8 Claims. (Cl. 167—49)

For the purpose of combating insects on useful plants, in particular on fruit-trees, frequently very sticky products are used, mostly composed of resins, non-drying oils, fats, soaps, tar-products and the like. These combating agents known under the name of caterpillar-glue generally are used in such a way that they are applied annularly round the trunks of the trees and the like to be protected. With these so-called insect-traps it is attempted to prevent the insects to be combated, such as caterpillars, beetles and the like, to move upwards along the trunk and to reach the top of the tree.

One of the first demands made upon the various caterpillar-glues used so far was a highly adhesive power, and that to such an extent that not only the small and light insects but also the bigger ones touching the glue are held permanently by it, unable to get away from the glue. This demand was made as it was feared that if the adhesive power would be insufficient for holding the insects permanently, these would be able to cross the glue-rings and to reach the tree-part to be protected after all.

Now it has appeared that when applying glues with a high adhesive power often the combating of the insects is not quite effective after all, as in spite of the sufficiency of the adhesive power for holding the insects permanently, many of them succeed in passing the glue-rings and reaching the parts of the plants to be protected. This phenomenon especially occurs with some species of insects, particularly the winter-butterfly.

Upon closer examination it has been definitely established that this phenomenon occurring at the application of caterpillar-glue with a high adhesive power, takes place in the following way. The insects to be combated form a sort of a bridge over the glue-ring. This seems to be done in such a way that if for instance in the case of the winter-butterfly—the females of which cannot fly— a female butterfly creeping upwards along the trunk of the tree, comes on the glue-ring and is stuck to it, a number of male specimens gather round the caught insect, after which another female is able to move over the group of insects stuck to the glue and comes on a part of the glue-ring above this group, where it is stuck in its turn. This goes on until finally the range of the stuck insects reaches the upper end of the ring, after which a following insect is able to come on the part of the tree-trunk above the ring via the so-formed bridge.

The invention now is based on the insight that the above described undesirable phenomenon can be avoided by applying as a combating agent a caterpillar-glue or similar adhesive product, the adhesive power of which is chosen such that the bigger insects, particularly the females of the winter-butterfly, when touching it, do not stick to it, but can turn away from the sticky place.

It has appeared that when using a caterpillar-glue with such a relatively low adhesive power, in any case lower than necessary for holding permanently the bigger insects, a better protection is obtained than when using a caterpillar-glue with a high adhesive power, such as used up till now.

The adhesive power admitted for the combating agents applied according to the present invention can be determined experimentally without any difficulty. If it proves to be too high, it is possible by alteration of the composition to obtain a combating agent coming up to the demands made according to the invention with respect to the adhesive power. So for instance it is possible to alter the adhesive power of caterpillar-glue being composed on the basis of chlorinated hydrocarbons and containing resins and/or asphalt-bitumens as further components, by modification of the percentage of one or both of the latter.

Although the sticky combating agents for insects applied according to the invention have an adhesive power which ordinarily is considerably lower than that of the products used up till now for this purpose, yet the decrease of the adhesive power is bound to certain limits, as the application of agents having too small and adhesive power may involve the danger that the insects touching it are not hindered by it and will be able to move freely over the glue-bands applied round the tree-trunk.

In the process according to the invention the required adhesive power preferably is determined experimentally, namely by experiments with insects combined with standardized methods using apparatus known in principle. When taking as a measure for the adhesive power the time required to remove a body with a round, flat, glassy under-surface of 30 mm. diameter from the glue on which it has been pressed, applying a tensile forth equal to the weight of the body plus 20 g. at 20° C., this time is according to the invention between 10 and 30 seconds.

It has further been found that particularly effective agents for the purpose of combating insects, especially on fruit-trees and other useful plants, are formed by products consisting wholly or for the greater part of chlorinated paraffins, to which is added a small quantity of a substance increasing the dripping point without having an unfavourable action on the durability, such as aliphatic hydrocarbons solid at normal temperature. By durability is meant here that the trapping and adhesive power does not alter during and after periods of low temperature and/or by chemical influences. As it has been found, the thus composed combating agents meet all the requirements made upon a good caterpillar-glue, especially regarding the adhesive and trapping power, consistency, spreading power and durability.

The caterpillar-glues applied according to the invention particularly excel in keeping their trapping and adhesive power during and after frost-periods, whereas also during the period wherein they are used they are not subjected to chemical alterations by which their properties as a combating agent would deteriorate.

The chlorinated paraffins as such are not suited to the purpose in view, as a result of their low dripping point, which generally lies under 20° C. By adding a small quantity, for example a few percentages, of paraffin or similar aliphatic hydrocarbons being solid at ordinary temperature, the dripping point of the chlorinated paraffins however is raised so much that at ordinary or moderately raised temperature no more or practically no more dripping occurs.

As a main component of the combating agents applied according to the invention more specially the chlorinated products of the paraffins prepared synthetically for instance according to the known synthesis of Fischer-Tropsch are taken into account, as it has been found that therewith generally more active products are obtained than when starting from chlorinated native paraffins.

As substances, used in the combating agents according to the invention for the purpose of raising the dripping point, preferably synthetic paraffins, for instance prepared according to the process of Fischer-Tropsch, are applied. Generally it is possible to use smaller quantities thereof than of native paraffins, especially when using synthetic paraffin with a melting point higher than about 60° C.

Usually an addition of paraffin of for example a few percentages is sufficient. If required somewhat larger quantities may be added, for example of 5% or more, by which the consistency of the end-product is often improved. In general additions of more than about 10% however are not allowed, as this would give products with too high an adhesive power. Because for combating agents containing chlorinated paraffins it is also desirable that the adhesive power is not so high that the bigger insects, particularly the females of the winter-butterfly, are stuck to it permanently, but that they can turn away from it. It appeared that the addition of larger quantities of paraffin, especially at low temperatures, also caused a decrease of the trapping power, that is the power of holding immediately and permanently small and light insects.

The agents for combating insects applied according to the present process may contain, besides the chlorinated paraffins as main component, further components such as resins, asphaltbitumen, filling agents and the like.

In some cases the resistance against the action of rain of the combating agents containing chlorinated paraffins is not quite sufficient. As has been found further this resistance can be considerably improved by adding a small quantity, for example a few percents of an oleophylic substance. For example an addition of 5% oleic acid gave products with a very good resistance against the action of rain. The use of naphthenates, for example naphthenate of zinc, as an oleophylic substance also gave favourable results.

The application of the combating agents according to the present invention can be carried out in a known manner by applying the product directly to the trunks of the trees to be protected, or spread on a substratum for example of paper, fixed in strips round them.

As an example of a composition giving very good results in combating the winter-butterfly may be mentioned a mixture consisting of chlorinated synthetic paraffin, to which is added about 6% synthetic paraffin (melting point 62° C.) and 5% oleic acid. This mixture, having a relatively low adhesive power in comparison with good caterpillar-glues, proved to meet the requirements to be made upon a good product, especially regarding the resistance against the action of rain, durability, spreading power and consistency. With this mixture a quite effective combating of the winter-butterfly was obtained during the whole period wherein it is dangerous, as has been established from experiments, where strips of asphalt-paper covered with the glue were fixed round the tree-trunks.

I claim:

1. A tree banding composition for controlling insects such as the winter butterfly, which has an adhesive power sufficient to hold permanently members of one sex but not to hold permanently larger members of the other sex of an insect species and which comprises chlorinated paraffin as the principal adhesive component, a quantity not exceeding about 10% of a normally solid aliphatic hydrocarbon that raises the melting point of the chlorinated paraffin, and a small quantity of an oleophilic fatty acid substance.

2. A tree banding composition as described in claim 1, said chlorinated paraffin being a chlorinated synthetic paraffin.

3. A tree banding composition as described in claim 1, said aliphatic hydrocarbon being a paraffin.

4. A tree banding composition as described in claim 1, said aliphatic hydrocarbon being a synthetic paraffin having a melting point above 60° C.

5. A tree banding composition for controlling insects such as the winter butterfly, having an adhesive power such that it requires between 10 and 30 seconds to remove from a layer of the composition at 20° C., by means of an effective pull of 20 grms., a body having a circular flat glassy contacting surface 30 mm. in diameter, said composition consisting essentially of chlorinated paraffin, a quantity not exceeding about 10% of a normally solid aliphatic hydrocarbon that raises the melting point of the chlorinated paraffin, and in the order of 5% of an oleophilic fatty acid substance.

6. A tree banding composition as described in claim 5, said chlorinated paraffin being a chlorinated synthetic paraffin.

7. A tree banding composition as described in claim 5, said aliphatic hydrocarbon being a paraffin.

8. A tree banding composition as described in claim 5, said aliphatic hydrocarbon being a synthetic paraffin having a melting point above 60° C.

BERT HUBERT.

REFERENCES CITED

The following references are of record in the file of this patent:

UNITED STATES PATENTS

| Number | Name | Date |
| --- | --- | --- |
| 1,527,715 | Thieme | Feb. 24, 1925 |
| 1,545,005 | Meyer et al. | July 7, 1925 |
| 2,083,984 | Buchanan | June 15, 1937 |
| 2,214,326 | Gregory | Sept. 10, 1940 |

FOREIGN PATENTS

| Number | Country | Date |
| --- | --- | --- |
| 489,494 | Great Britain | July 25, 1938 |